United States Patent
Ackley et al.

(10) Patent No.: US 8,899,474 B2
(45) Date of Patent: Dec. 2, 2014

(54) INTERACTIVE DOCUMENT READER

(75) Inventors: Jonathan Ackley, Glendale, CA (US); Amber Samdahl, Sierra Madre, CA (US); Amy K. Van Gilder, Los Angeles, CA (US); Lanny S. Smoot, Thousand Oaks, CA (US); Shelley Short, Altadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1533 days.

(21) Appl. No.: 12/211,639

(22) Filed: Sep. 16, 2008

(65) Prior Publication Data

US 2009/0298586 A1 Dec. 3, 2009

Related U.S. Application Data

(60) Provisional application No. 61/058,128, filed on Jun. 2, 2008.

(51) Int. Cl.
*G06F 17/00* (2006.01)
*A63F 13/30* (2014.01)
*H04N 1/00* (2006.01)

(52) U.S. Cl.
CPC ......... *A63F 13/12* (2013.01); *A63F 2300/5573* (2013.01); *H04N 1/00291* (2013.01); *A63F 2300/30* (2013.01); *A63F 2300/208* (2013.01)
USPC ............ 235/375; 235/379; 235/487; 705/1.1; 705/17

(58) Field of Classification Search
USPC .......... 235/462, 487, 494, 375, 380; 705/1.1, 705/17; 345/7, 156
See application file for complete search history.

(56) References Cited

U.S. PATENT DOCUMENTS

| | | | |
|---|---|---|---|
| 5,080,480 A | 1/1992 | Weiss | |
| 5,511,148 A * | 4/1996 | Wellner | 358/1.6 |
| 6,462,868 B1 | 10/2002 | Giesberg et al. | |
| 6,690,402 B1 * | 2/2004 | Waller et al. | 715/850 |
| 6,967,566 B2 | 11/2005 | Weston et al. | |
| 7,314,177 B2 | 1/2008 | Lapstun et al. | |
| 7,397,464 B1 * | 7/2008 | Robbins et al. | 345/173 |
| 2004/0125413 A1 * | 7/2004 | Cordery | 358/3.28 |
| 2006/0103627 A1 | 5/2006 | Watanabe et al. | |
| 2006/0256944 A1 | 11/2006 | Silverbrook | |
| 2007/0248289 A1 | 10/2007 | Pfleging et al. | |

FOREIGN PATENT DOCUMENTS

EP 1796021 6/2007

OTHER PUBLICATIONS

Peterson, "Pervasive and Ubiquitous Public Map Displays" ICA UPIMap2004, Tokyo.

* cited by examiner

*Primary Examiner* — Michael G Lee
*Assistant Examiner* — Tabitha Chedekel
(74) *Attorney, Agent, or Firm* — Patent Ingenuity, P.C.; Samuel K. Simpson

(57) ABSTRACT

The subject matter disclosed herein relates to systems for providing an interactive document reader.

20 Claims, 11 Drawing Sheets

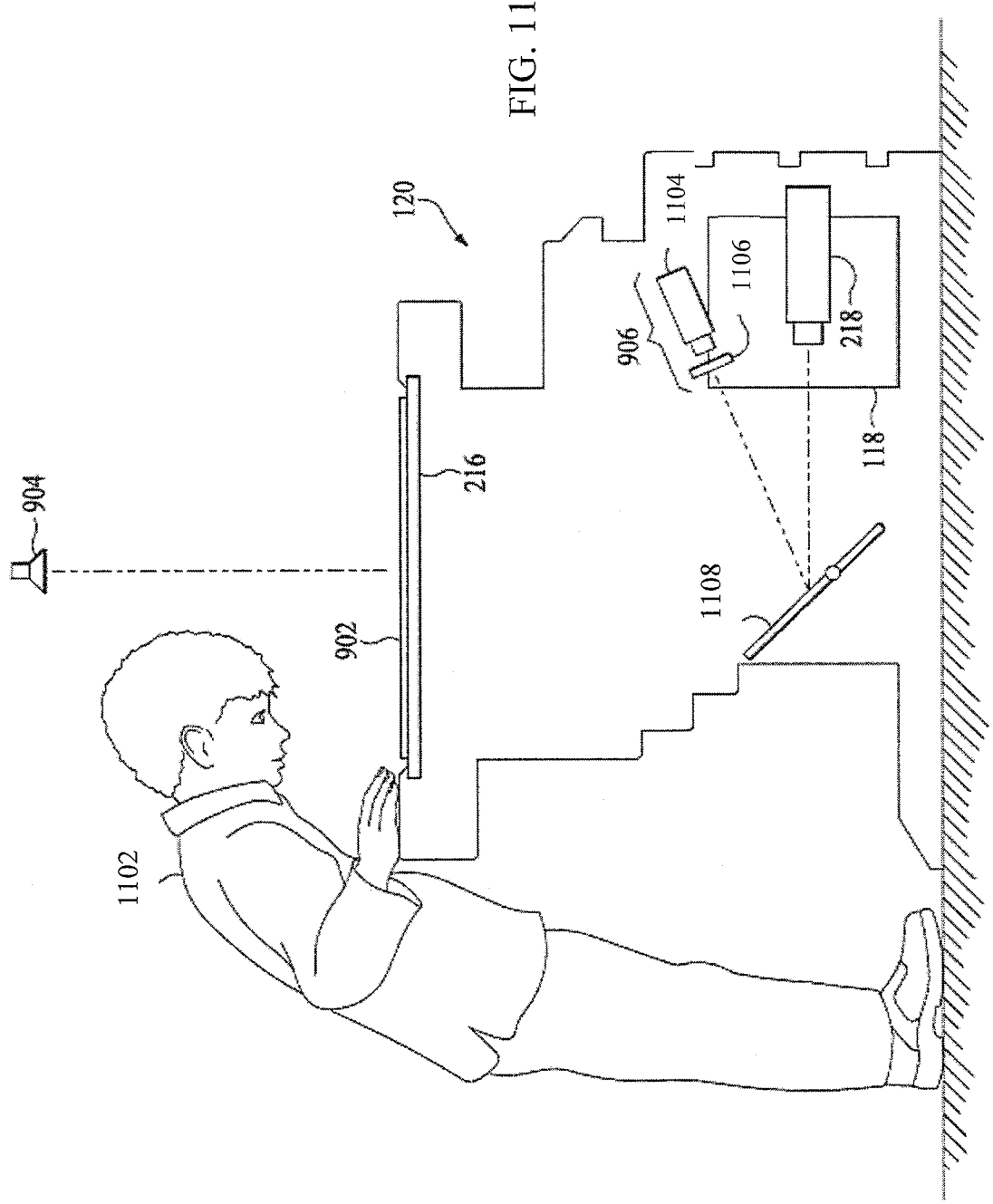

INTERACTIVE DOCUMENT READER

CROSS-REFERENCES TO OTHER APPLICATIONS

The present application claims the benefit of U.S. Provisional Application No. 61/058,128 filed Jun. 2, 2008.

BACKGROUND

1. Field

The subject matter disclosed herein relates to systems and methods for providing an interactive document reader.

2. Information

Participants in an interactive game may physically move about in a gaming environment to move from location to location. A gaming environment may be included in a theme park and/or may be located over one or more geographic region(s) of arbitrary size. Participants may interact with one another, machines, and sensors. For instance, a gaming environment located over a wide geographical region may be populated with one or more machines to, among other things, interact with participants. Computing and network communication technology enable game participants to interact with one another and their environment as part of an interactive game experience. Information relevant to individual participants may be stored and accessed within the gaming environment to personalize a gaming experience.

DESCRIPTION OF THE DRAWING FIGURES

FIG. 11 is a partial sectional side view illustrating a document reader in an interactive gaming environment in accordance with one or more embodiments.

Reference is made in the following detailed description to the accompanying drawings, which form a part hereof, wherein like numerals may designate like parts throughout to indicate corresponding or analogous elements.

DETAILED DESCRIPTION

Figure 1:
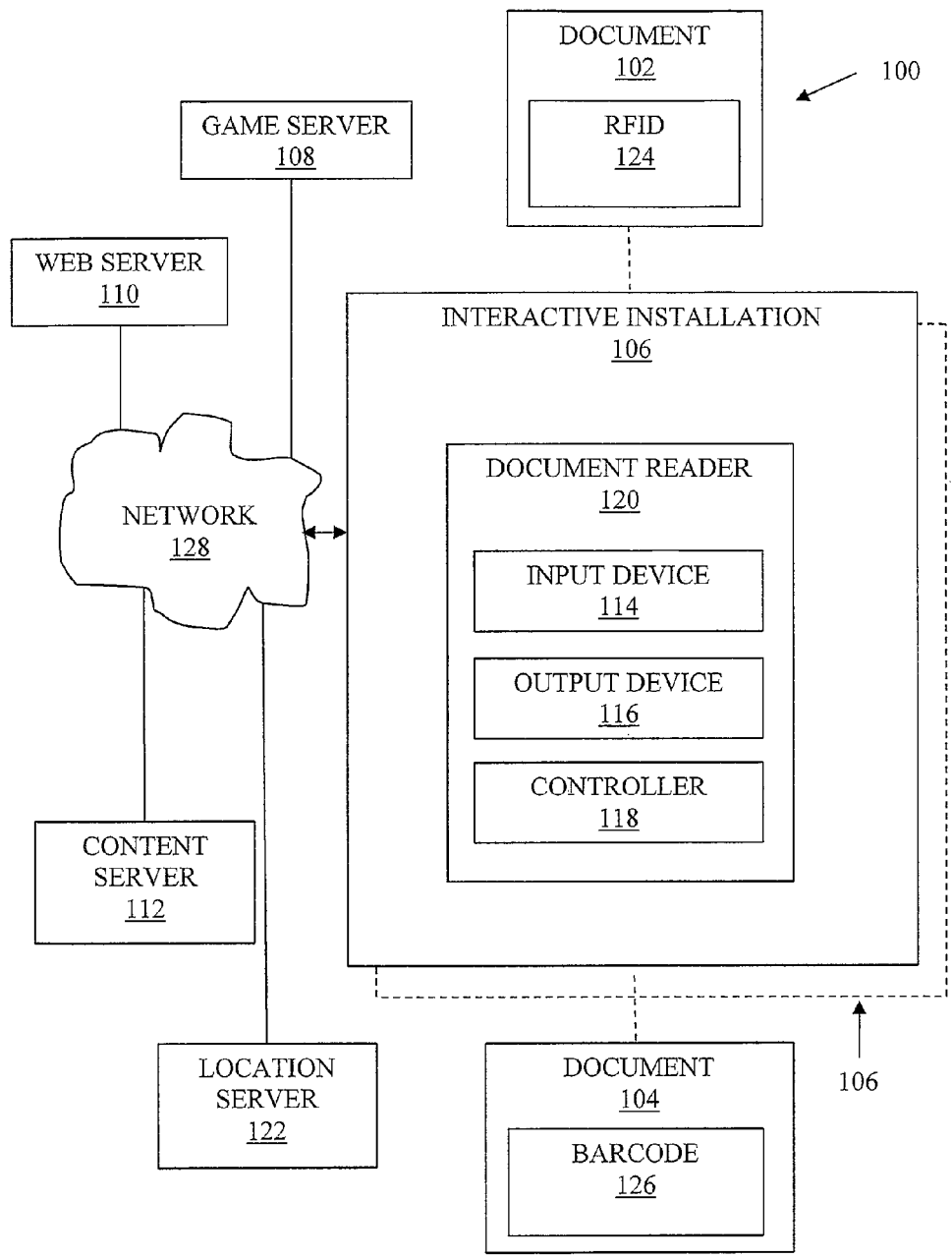
FIG. 1 is a schematic diagram of a system to provide an interactive gaming experience to game participants in accordance with one or more embodiments.

The present invention relates to an interactive document reader that enables a person possessing a document to view additional information that is not visible or apparent to the person without the interactive document reader. The invention is described in terms of a specific gaming implementation where the document comprises a physical document, such as a map that may be a blank piece of paper, cloth, parchment, vellum or the like or may have some fixed information printed or applied to the map surface. More generally the invention is useful to provide additional information in the form of text, graphics, highlighting, video, animation and the like to augment fixed information on any kind of document made of a wide variety of materials. Hence, in addition to a map used in a game, the present invention may be used as a learning tool to highlight or guide readers through written material as well as in business applications to highlight immediately important information in complex documents such as manuals, schematic diagrams and the like. The present invention is generally useful where it is desirable to highlight or augment printed information provided in document form.

According to one or more embodiments, an interactive installation implementing an interactive document reader in accordance with the present invention may respond to detection of a presence of a particular participant in proximity to the interactive installation. Such a presence may be detected by detection of a signature associated with a document co-located with the particular participant. Additionally or alternatively, such a presence may be detected by detection of a document co-located with the particular participant. In one particular embodiment, the interactive installation may respond to such a detection of the presence of the participant by generating one or more special effects.

In particular embodiments illustrated herein, participants in an interactive game may physically move about in a gaming environment to interact with one another, machines, audio visual devices, sensors and/or the like. For instance, a gaming area over a geographical region may be populated with one or more interactive installations to, among other things, provide special effects to be experienced by such participants. Such special effects may be generated in response to actions taken by the participants and/or associated game states.

According to one or more embodiments, an interactive gaming system may provide an interactive gaming experience to one or more "game participants" ("game participant" is used interchangeably herein with "participant"). In one particular embodiment, a game participant may interact with an interactive gaming system through one or more "documents," which may be capable of interaction with one or more other elements of the interactive gaming system. A document may comprise a physical sheet of media or similar object that contains information. For example, such a sheet of media may comprise, paper, paper board, plastic sheeting, laminated sheeting, cloth, onion-skin, parchment, vellum, scrim material, and/or the like.

In particular embodiments, a document may be associated with an orientation and/or signature item associated with a specific document, individual game participant, or group of game participants. The orientation and/or signature item comprises, for example a radio frequency identification (RFID) identification code, barcode, and/or the like. The orientation and/or signature item may be detected by a document reader portion of an interactive installation for determining the identity of game participant(s) interacting with a document reader.

An orientation item may be detected by and/or associated with a document reader portion of an interactive installation for determining the position or orientation of a document with respect to a document reader. An orientation item may comprise one or more color patches, one or more reflective patches, one or more RFID devices, one or more barcodes, and/or the like, as will be discussed in greater detail below. In some embodiments, a signature item and an orientation item may be implemented by the same device. For example, one or more RFID devices, one or more barcodes, and/or the like, may be utilized as both a signature item as well as an orientation item.

FIG. 1 provides a schematic diagram of an interactive document reader system 100 that is part of a game system. In the implementation of FIG. 1 game participants associated with documents (e.g., documents 102 or 104) participate in a gaming experience at interactive installations 106 controlled at least in part by a game server 108. Interactive installations 106 may be dispersed over a geographic area such as that of a theme or amusement park. In other embodiments, interactive installations 106 may be dispersed over a geographic area such as a neighborhood, shopping center, school or business campus, convention center, theatre complex, town, metropolitan area, political subdivision such as a city, and/or state or nation.

According to one or more embodiments, a game participant may travel to different interactive installations 106 while carrying a document 102/104. Such a game participant may communicate with game server 108, web server 110 and/or content server 112 via such interactive installations 106 to participate in a gaming experience. The game experience involves providing additional information to the participant using document 102/104 at interactive installation 106 in a way that the game experience is enabled and/or enhanced by the presentation of the additional information. As specific examples, the document 102/104 may include fixed information in the form of a map and the interactive installation augments the fixed information by projecting a trail, or turn-by-turn text directions to a desired location. The additional information may be in the form of text, graphics, symbols, video, animation, and the like that can be dynamically configured for display on document 102/104 preferably in alignment with the fixed information on document 102/104.

According to one or more embodiments, game server 108 and/or content server 112 communicates with one or more interactive installations 106 to provide an interactive gaming experience to a game participant. For example, content server 112 provides information to an interactive installation 106 for presentation to a game participant in an audible and/or visual format. Game server 108 may communicate with one or more interactive installations 106 to receive information and affect a gaming experience for one or more interactive game participants.

An interactive installation 106 may comprise an input device 114 to receive input from game participants, an output device 116 to provide output and a controller 118 to control and coordinate functionality and behavior of input device 114 and output device 116 with other elements of gaming system 100. Output device 116 comprises devices for displaying additional information to augment fixed information on documents 102/104. In addition to presenting this additional information, output device 116 may comprise one or more devices capable of providing sensory stimuli to an interactive game participant including, for example, visual displays, audio output devices, electromechanically controlled devices (e.g., animated robots, door/window openers, force feedback, air jets, liquid sprays, scent sprays, vending machine access, activating a locking device to open/close a lock, and/or the like). Output device 116, by itself and/or in combination with other output devices 116, may provide a special effect that may be experienced by a game participant at or in proximity to the interactive installation 106. Such a special effect may be initiated and/or controlled by commands from game server 108, for example.

In accordance with the present invention, input device 114 functions to obtain information from document 102/104 including information from any orientation and/or signature devices associated with document 102/104. Additionally, input device 114 may comprise one or more devices such as microphones, cameras, environmental sensors (e.g., light, temperature, vibration and moisture), electromechanical switches and/or actuators. Controller 118 may comprise a computing platform which is adapted to communicate with input device 114 and output device 116 as peripheral devices over standard or special-purpose device interfaces. Controller 118 may perform signal processing, data compression/decompression, data encoding/decoding of information to be transmitted between interactive installation 106 and game server 108 and/or content server 112. Controller 118 also may comprise a communication adapter to communicate with game server 108 and/or content server 112 over standard communication protocols.

According to one or more embodiments, an interactive installation 106 also may comprise a document reader 120 capable of detecting various attributes of document 102/104 such as presence, size, scale, orientation, rotation, as well as printed and non-printed information associated with the document 102/104. As illustrated, document reader 120 may comprise all or portions of input device 114, output device 116, and/or controller 118. For example, determining a location of a game participant and/or document 102/104 may comprise, at an interactive installation 106, sensing a radio frequency identification (RFID) device 124 and/or barcode 126 co-located with the game participant. For example, a device comprising a label with an RFID device 124 and/or barcode 126 may be co-located with and/or fixed to a game participant and/or document 102/104 associated with a game participant. Location server 122 may uniquely associate the RFID device 124 and/or barcode 126 with the game participant. In one particular embodiment, when a participant arrives at an interactive installation 106, document reader 120 may sense RFID device 124 and/or barcode 126 co-located with the participant. The document reader 120 may then transmit information to location server 122 representing the sensed RFID device 124 and/or barcode 126 with information identifying the particular interactive installation 106 where the RFID device 124 and/or barcode 126 was sensed. Using this information location server 122 may deduce that the game participant associated with the sensed RFID device 124 and/or barcode 126 is in the vicinity of a specific interactive installation 106.

Figure 2:
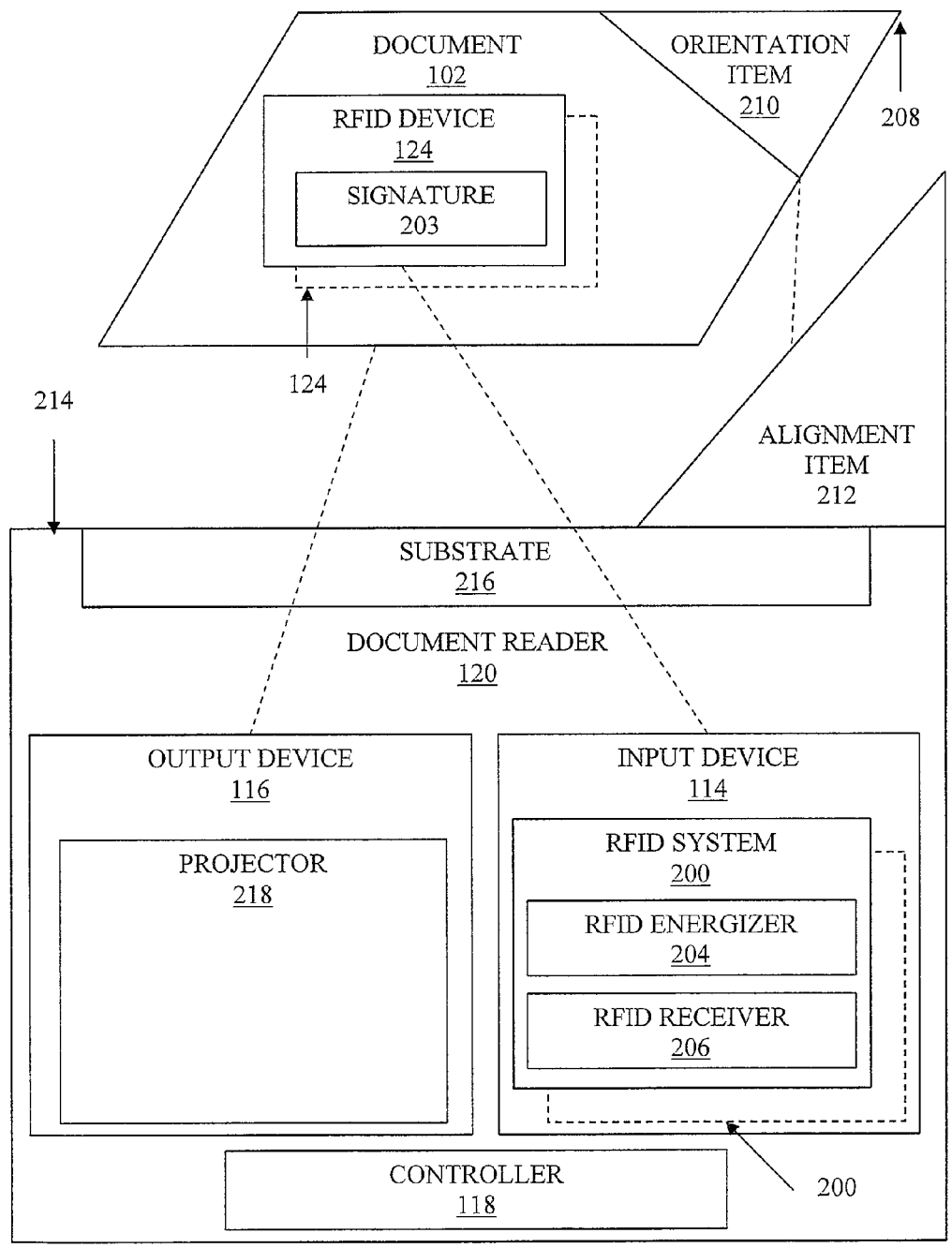
FIG. 2 is a schematic diagram illustrating a document reader in an interactive gaming environment in accordance with one or more embodiments.

FIG. 2 is a schematic diagram of a document reader 120 according to one or more embodiments. In the particular implementation of FIG. 2, input device 114 comprises a radio frequency identification (RFID) energizer/reader system 200 capable of detecting the presence of one or more RFID devices 124 associated with document 102. When energizer/reader system 200 detects a presence of RFID device 124 in proximity to document reader 120 (e.g., from RFID device 124 being within a detection range), energizer/reader system 200 may extract an RFID code from a received signal that is associated with an identity of a particular game participant. With document reader 120 being positioned at a particular geographical location (e.g., at a theme park), detection of an RFID device 124 associated with an identity of a game participant may be used to approximate the location of the game participant at the particular geographical location of document reader 120. RFID device 124 may comprise a signature item 203 associated with an individual game participant for determining the identity of an individual game participant interacting with a document reader 120.

According to an embodiment, an RFID device 124 attached to and/or co-located with a participant may comprise a semi-active RFID device 124, which is adapted to transmit a signal in response to first receiving an initial signal transmission from an energizer/receiver system 200 located with document reader 120, rather than constantly transmit a signal. According to a particular embodiment, document reader 120 may comprise an energizer/receiver system 200 having an RFID energizer 204 and an RFID receiver 206 pair. In one particular embodiment, energizer/receiver system 200 may comprise one or more components and/or systems provided by Axcess Inc. Here, such an RFID energizer 204 may transmit an initial signal encoded with information identifying the source energizer/reader system 200. Upon receiving the initial signal, RFID device 124 may transmit a signal to RFID receiver 206 encoded with the information identifying the source energizer/reader pair system 200 and additional information identifying RFID device 124 (e.g., RFID code associated with an individual participant). Upon receipt of such a response signal from RFID device 124 at energizer/reader system 200, location server 122 (see FIG. 1) may determine that the RFID device 124 is in proximity to document reader 120 co-located with the energizer/reader system 200, for example. Additionally, such semi-active detection of RFID device 124 may provide longer range detection than may be possible with the use of passive RFID devices while avoiding false detections with the use of active RFID devices. In alternative embodiments, however, an interactive installation may employ passive and/or fully active RFID devices for detecting the presence of an RFID device as being in proximity.

Additionally or alternatively, one or more RFID devices 124 may be capable of read/write operations. Energizer/receiver system 200 may read metadata from RFID device 124. Additionally or alternatively, energizer/receiver system 200 may write such metadata to RFID device 124.

Additionally or alternatively, one or more RFID devices 124 may comprise an orientation item 210 for determining the orientation of document 102 with respect to document reader 120. As used herein, the word "orientation" refers to the relative positioning, scale and rotation of document 102 with respect to document reader 120. For example, the word "orientation" may mean a lateral displacement, a horizontal displacement, a rotational displacement, a vertical displacement, and/or the like, of document 102 with respect to document reader 120. Lateral displacement refers to a displacement along a first axis oriented parallel to substrate 216. Horizontal displacement refers to a displacement along a second axis oriented parallel to substrate 216. Rotational displacement refers to an angular displacement about an axis oriented perpendicular to substrate 216. Vertical displacement refers to a displacement along an axis oriented perpendicular to substrate 216. Orientation item 210 may comprise a single RFID device 124 located near one corner 208 of document 102. Energizer/reader system 200 may be located within document reader 120 so as to detect when corner 208 of document 102 has been adjusted to a suitable position with respect to document reader 120. Controller 118 determines an approximate orientation of document 102 based at least in part on the reading of the single RFID device 124 made by the energizer/reader system 200. Document reader 120 may alter the appearance of document 102 by projecting additional information using projector 218. The additional information is aligned with printed information, graphics, and edges of document 102. This additional information may be used to provide supplementary text, graphics, or to present a special effect to the one or more game participants. For example, the appearance of document 102 may be altered to present a visual special effect comprising a still image, an animated image, text, symbols, directional indicators, highlights and/or the like. Additionally or alternatively, the appearance of document 102 may be altered to present a visual special effect comprising illuminating a hidden portion (see item 418 in FIG. 4) of document 102.

To facilitate such an adjustment of document 102 to a suitable position, orientation item 210 may comprise a physical and/or visual indicator portion. Such an indicator portion of orientation item 210 may indicate to a participant how document 102 is intended to be aligned with document reader 120. For example, indicator portion of orientation item 210 may comprise a visual indicator such as an icon, directional arrow, and/or the like. A corresponding visual alignment guide 212 may be located on document reader 120, which may likewise comprise a visual indicator such as an icon, directional arrow, and/or the like. A participant may align the visual indicator portion of orientation item 210 with the corresponding visual alignment guide 212 of document reader 120 in order to adjust document 102 to a suitable position. Indicator portion of orientation item 210 may comprise a physical indicator such as a divot, recess, and/or the like. A corresponding physical alignment guide 212 of document reader 120 may be located on document reader 120, which may likewise comprise a physical device such as a rail, protuberance, frame, indentation, niche, and/or the like. A participant may align a physical indicator portion of orientation item 210 with such a corresponding physical alignment guide 212 of document reader 120 in order to adjust document 102 to a suitable position.

Document reader 120 is configured to alter the appearance of document 102 to present additional information such as a special effect to the one or more game participants. The manner in which the additional information is presented may be altered based at least in part on the position, size, color, or other characteristics of document 102. For example, additional information such as a visual special effect may be scaled based on the distance between document 102 and document reader 120 so that additional information projected onto document 102 appears at a desired scale on the surface of document 102. Additional information such as a visual special effect may be scaled to compensate for shrinkage, expansion, and/or being out of focus due to a distance between output device 116 and document 102. As an alternative to measuring a vertical displacement, such a vertical displacement may be assumed to correspond with a predetermined position of document 102 with respect to document reader 120, based, at least in part, on the known position of substrate 216. Similarly, a rotational displacement may be used to rotate additional information such as a visual special effect that is projected onto document 102 based on a rotational skew between document 102 and document reader 120. As an alternative to measuring a rotational displacement, such a rotational displacement may be assumed to correspond with a predetermined position of document 102 with respect to document reader 120, based, at least in part, on an alignment of orientation item 210 with corresponding alignment portion 212 of document reader 120. Additional information such as a visual special effect projected onto document 102 may be displaced horizontally and/or laterally based on a horizontal and/or lateral alignment between document 102 and document reader 120.

Such a horizontal and/or lateral displacement may be approximated by controller 118 based at least in part on the readings made by energizer/receiver system 200 detecting single RFID device 124 at a predetermined position with respect to document reader 120. For example, energizer/receiver system 200 may be oriented and/or arranged to read an RFID device 124 located in a predetermined portion of document 102 (such as corner 208) when RFID device 124 is aligned within a predetermined location of window 216. In such a case, energizer/reader system 200 may only read RFID device 124 when corner 208 of document 102 is aligned with a corresponding corner of substrate 216. Based at least in part on the readings made by energizer/reader system 200 detecting single RFID device 124 at a predetermined corner of document reader 120, a horizontal and/or lateral displacement of document may be approximated by controller 118.

In some embodiments, energizer/reader system 200 comprises three or more RFID readers 206 for locating three or more RFID devices 124 associated with document 102. For example, three or more RFID devices 124 may be affixed in an arbitrary position to document 102, such that the three or more RFID devices 124 may be read by three or more RFID readers 206. Controller 118 may approximate the orientation of document 102 based at least in part on the readings made by the three or more RFID readers 206. For example, RFID readers 206 may make a measurement of distance and/or rotation between RFID readers 206 and RFID devices 124. Based at least in part on the measurements of distance and/or rotation made by the RFID readers 206, controller 118 may calculate the position, size, rotation of document 102. Increased accuracy in determining the orientation of document 102 may be obtainable through an increasing number of RFID devices 124 and/or an increasing number of RFID readers 206 within energizer/reader system 200.

In some embodiments, one or more RFID devices 124 may comprise both a signature item 203 as well as an orientation item 210. Such a signature item 203 may identity a game participant(s) interacting with a document reader, based on a radio frequency identification (RFID) identification code, and/or the like. Whereas an orientation item 210 may be detected for determining the position or orientation of a document with respect to a document reader. For example, one or more RFID devices 124 may be utilized for both determining the identity of an individual game participant interacting with a document reader 120 as well as for determining the orientation of document 102 with respect to document reader 120.

Document reader 120 may comprise an enclosed container 214 with a substrate 216 located thereon. For example, substrate 216 may be translucent and may comprise a frosted glass surface, a frosted plastic surface, a scrim covered surface, and/or the like. In cases where substrate 216 is translucent, inner workings of document reader 120 may be concealed from a participant, which is desirable in certain applications.

Figure 10:
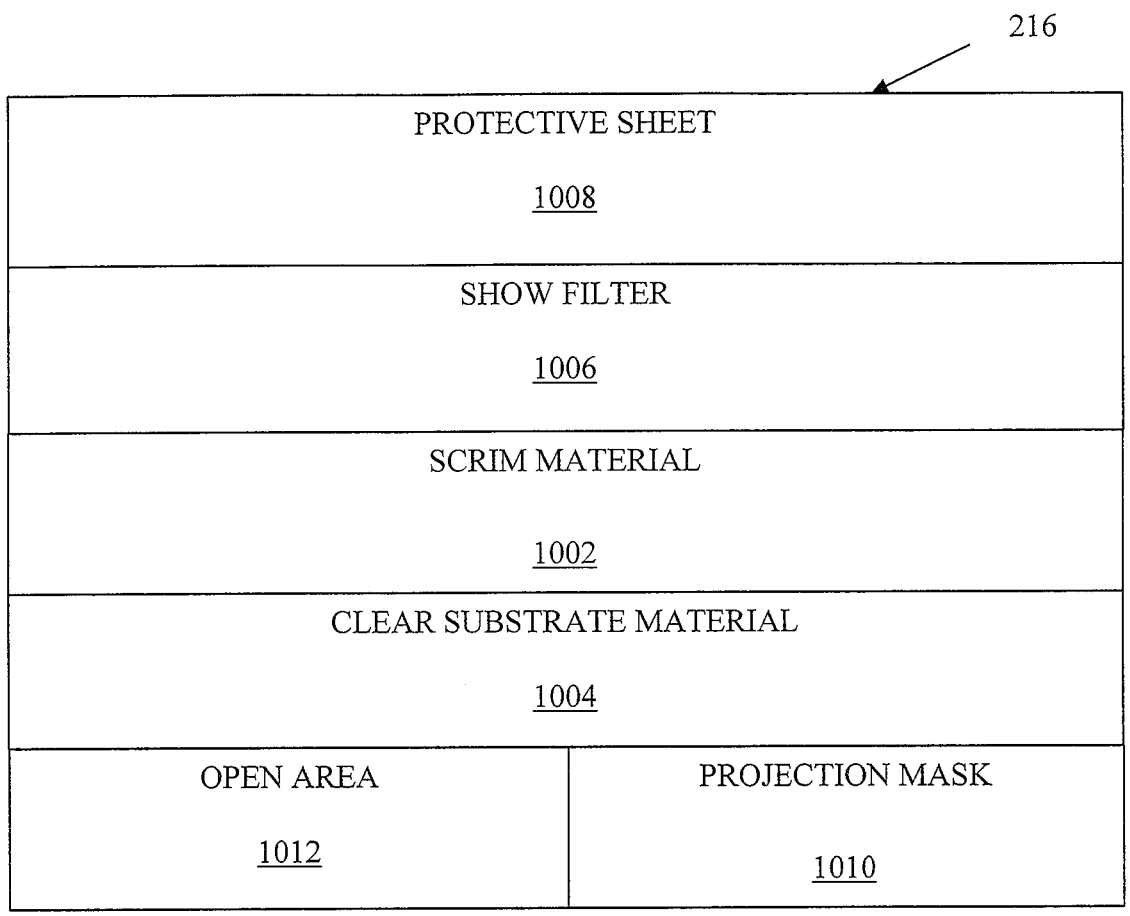
FIG. 10 is a schematic cross section illustrating a substrate for use with a document reader in an interactive gaming environment in accordance with one or more embodiments.

FIG. 10 provides a schematic cross section of a substrate 216 according to one or more embodiments. In the particular implementation shown in FIG. 10, substrate 216 comprises a scrim material 1002 supported by a clear substrate material 1004. Scrim material 1002 may comprise nylon chiffon and/or the like. Scrim material 1002 may be altered via marker, paint, die, and/or the like, so as to meet the needs of a particular application. For example, document reader 120 (shown in FIG. 1 through FIG. 5) may be designed to visually appear like a portion of a tree stump and scrim material may be altered to have a tree stump ring appearance to complement the tree stump appearance. In cases where substrate 216 comprises a scrim material 1002, exterior lighting (not shown) may illuminate an exterior surface of substrate 216 so as to further conceal the inner workings of document reader 120 from a participant. Clear substrate material 1004 may comprise acrylic, glass, plastic, and/or the like.

Additionally or alternatively, a show filter 1006 comprising a pigmented acetate gel or the like may be positioned above scrim material 1002. Show filter 1006 further darkens substrate 216 to conceal the inner workings of document reader 120 from an observer. Additionally or alternatively, a protective sheet 1008 comprising a layer of clear plastic or the like may be positioned on an outer surface of substrate 216 to protect scrim material 1002 and/or show filter 1006 from damage due to interaction of a participant or the environment with substrate 216.

Additionally or alternatively, a projection mask 1010 may be applied to clear substrate material 1004 in order to selectively block light projected from within document reader 120. Projection mask 1010 may be oriented and arranged so that if a document 102 (shown in FIG. 1 through FIG. 5) is placed on substrate 216, projection mask 1010 defines one or more open areas 1012 located beneath document 102 that are open to light projected from within document reader 120. Projection mask 1010 may be oriented and arranged so that if a document 102 is placed on substrate 216, projection mask 1010 may block light projected from within document reader 120 in areas located adjacent an outer edge of document 102.

Returning to FIG. 2 document reader 120 may comprise a projector 218 located within container 214. Such a projector 218 may render a video image to a participant. Projector 218 may project an image (e.g., additional information such as a graphic, animation, video images, text, highlighting or other visual special effect) through substrate 216 and onto document 102 so as to be viewable to a participant. For example, projected images may comprise animated video images that appear to the participant to move on the surface of the document 102.

An image from projector 218 may be diffused so as to be viewable to a participant. For example, in cases where substrate 216 comprises a frosted surface, such a frosted surface may operate to diffuse such a video image from projector 218. Additionally or alternatively, document 102 itself may operate to diffuse such a video image from projector 218. An increase in image brightness may be achieved in cases where document 102 operates as the primary diffuser.

Figure 3:
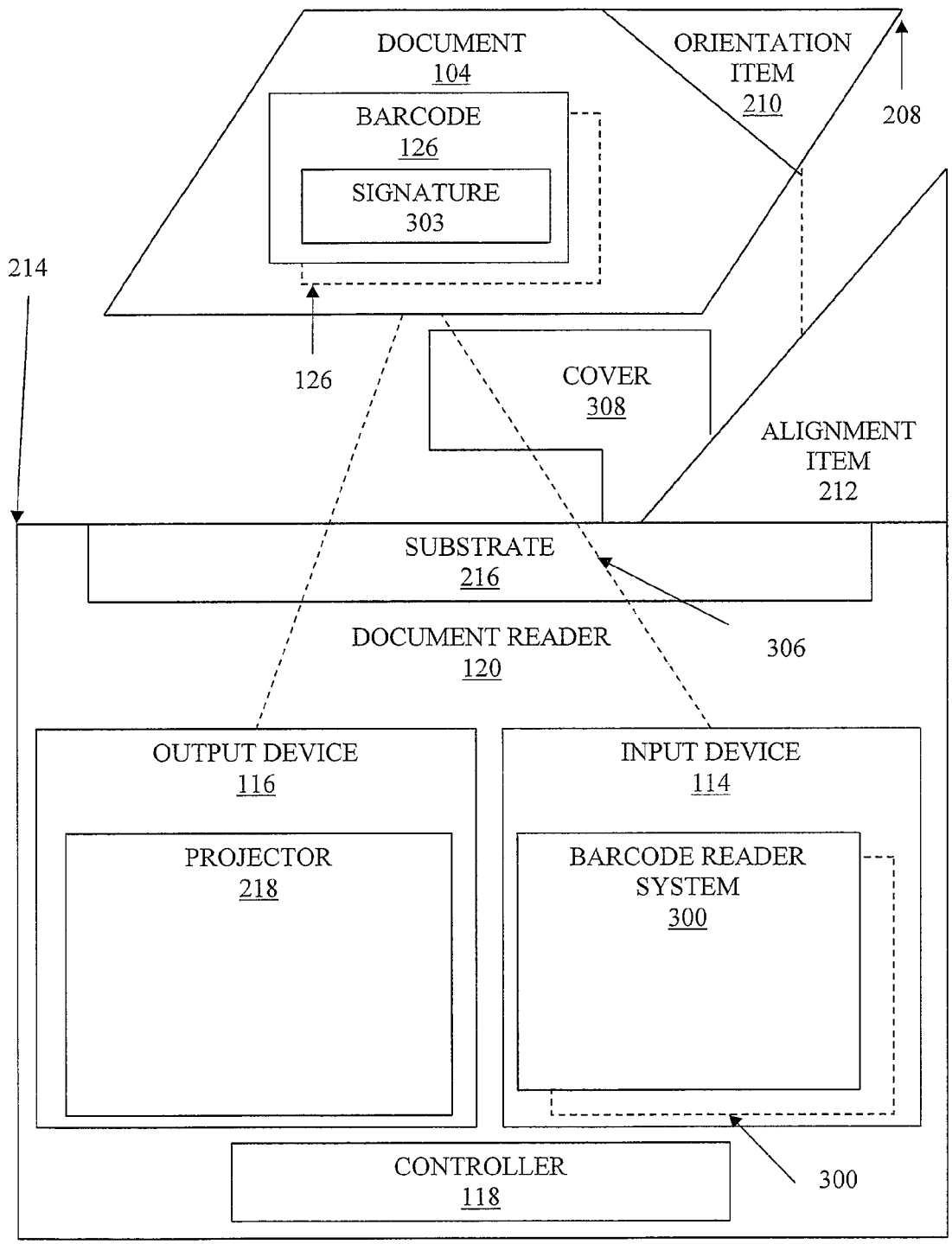
FIG. 3 is a schematic diagram illustrating a document reader in an interactive gaming environment in accordance with one or more embodiments.

As shown in FIG. 3, in alternative embodiments, document 104 may comprise a barcode 126. Barcode 126 is an example of a mechanism that, like RFID device 124 in FIG. 2, can be used to determine the location, position, and/or other information about document 104. For example, a label with a barcode may be co-located with, printed on, and/or affixed to or otherwise associated with document 104. The barcode signature may be associated with a specific document 104 and/or a specific person such as the game participant. A game such as described in reference to FIG. 1 may be implemented using a document 104 in addition to or as an alternative to document 102 shown and described in FIG. 1.

In the particular implementation shown in FIG. 3, input device 114 comprises a barcode reader system 300 capable of detecting the presence of one or more barcodes 126 associated with document 104. When barcode reader system 300 detects a presence of barcode 126 in proximity to document reader 120 (e.g., from barcode 126 being within a detection range), barcode reader system 300 may read a code that is associated with an identity of a particular game participant. Barcode 126 may comprise a signature item 303 associated with an individual game participant for determining the identity of an individual game participant interacting with a document reader 120. Such a signature item 303 may identity a game participant(s) interacting with a document reader, based on an identification code, and/or the like.

In some embodiments, barcode reader system 300 may comprise three or more barcode readers for locating three or more barcodes 126 associated with document 104. For example, three or more barcodes 126 may be affixed in an arbitrary position to document 104, such that the three or more barcodes 126 may be read by three or more barcode readers. Controller 118 may approximate the orientation of document 104 based at least in part on the readings made by the three or more barcode readers. For example, a lateral displacement, a horizontal displacement, a rotational displacement, a vertical displacement, and/or the like may be approximated based at least in part on the readings made by the three or more barcode readers. Increased accuracy in determining the orientation of document 104 may be obtainable through an increasing number of barcodes 126 and/or an increasing number of barcode readers within barcode reader system 300.

In some embodiments, barcode reader system 300 may be directed at document through a clear portion 306 of translucent substrate 216. Such a clear portion 306 may facilitate scanning of barcode 126 by barcode reader system 300. Additionally or alternatively, document reader 120 may comprise a cover 308 capable of shielding a participant from emissions from barcode reader system 300 and/or capable of shielding barcode reader system 300 from outside light. For example, cover 308 may be oriented and arranged so as to be positioned between a participant and clear portion 306 of translucent substrate 216. When document 104 is placed on translucent substrate 216, document 104 may be located beneath cover 308.

According to one or more embodiments an interactive game system operator may register individual game participants by creating records associated with the game participants in a database comprising information gathered as part of a registration process. Such records may be used to collect and maintain information regarding game participants such as, for example, name, age, birth date, food allergies, handicap status (e.g., no known handicap, blind, deaf, wheelchair bound), gender, residence address and/or any other information that may be associated with individuals. This information that is gathered may be used to tailor a game experience to particular preferences or needs of a participant.

As part of a registration process, an interactive game system operator also may issue RFID devices 124 and/or barcode devices 126 to the participants and include RFID codes of the issued RFID devices 124 and/or barcodes of issued barcode devices 126 in database records associated with the individual game participants. In another alternative, an interactive game system operator may obtain biometric information from participants (e.g., retinal scan, finger print, palm print) and maintain associated biometric signatures in database records associated with the individual game participants. RFID codes, barcodes and/or biometric signatures may be populated to location server 122 for use in detecting the presence of and specifically identifying a participant at an interactive installation 106.

Figure 4:
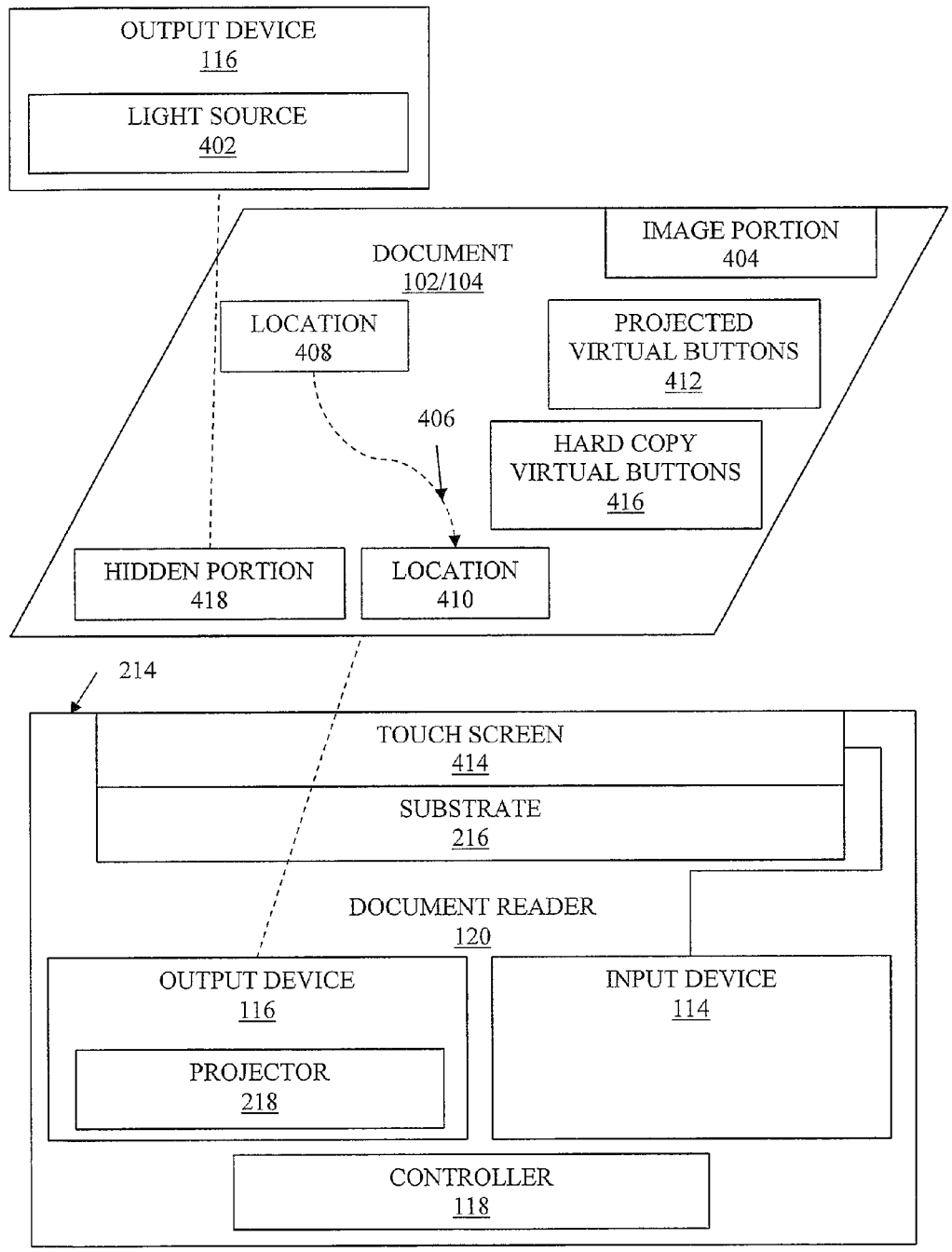
FIG. 4 is a schematic diagram illustrating a document reader in an interactive gaming environment in accordance with one or more embodiments.

FIG. 4 is a schematic diagram illustrating an example document reader 120 in accordance with one or more embodiments. In the particular implementation of FIG. 4, output devices 116 of interactive installations 106 (not shown) may comprise one or more output devices such as, for example, projector 218, light source 402, a speaker for providing an audio output and a high resolution display capable of displaying text, video images and/or still images. Output devices 116 may be used for presenting information rendered from media content received from game server 108 and/or content server 112, for example. Information that is presented may comprise images, highlighting, text, sounds, video, animation, symbols, and the like and/or combinations thereof. In some embodiments, media content comprises information that may be used to render a presentation that is to be passively experienced by a viewer or listener. Alternatively, media content may comprise interactive media content which is responsive to inputs and/or stimuli from a user.

Rear projected video images from projector 218 may comprise a visual indication 406 on document 102/104 of directions from one location 408 to another location 410. For example, document 102/104 may comprise a map of a gaming environment or other environment illustrating multiple destinations. Visual indication 406 comprises a static image such as a path, highlighting of a path that is printed on document 102/104, textual turn-by-turn directions, pictures of landmarks, animated images, video instructions and/or the like.

Additionally or alternatively, projected video images from projector 218 may comprise one or more projected virtual buttons 412. Such projected virtual buttons 412 may be conveyed as a still image and/or an animated image 404 onto the document 102/104 by projector 218. For example, such projected virtual buttons 412 may appear as alphanumeric keys, icons, radio buttons, check boxes, pull down menus, still images, animated images, and/or the like. Projected virtual buttons 412 may permit a participant to interact with document reader 120 via a touch screen 414 portion of input device 114.

Similarly, document 102/104 may comprise one or more hard copy virtual buttons 416. Hard copy virtual buttons 416 comprise information and graphics that are printed, stamped, affixed to or otherwise associated with document 102/104 so that they are visually apparent whether or not the document is being viewed at an interactive reader 120. Hard copy virtual buttons 416 may be located at a surface of document 102/104. Hard copy virtual buttons 416 may appear as alphanumeric keys, icons, radio buttons, check boxes, pull down menus, still images, animated images, and/or the like. Hard copy virtual buttons 416 may permit a participant to interact with document reader 120 via a touch screen 414 portion of input device 114.

Virtual buttons 412/416 may permit a participant to enter a response to a question, enter a query, ask for assistance, ask for directions, and/or the like. Additionally or alternatively, image portion 404, visual indication 406 of directions, locations 408/410, and/or a hidden portion 418 also may operate as virtual buttons 412/416 to facilitate interaction with document reader 120 via touch screen 414.

Light source 402 may illuminate a hidden portion 418 of document 102/104. For example, such a light source 402 may project ultraviolet light or the like toward hidden portion 418. Such a hidden portion 418 may be rendered on document 102/104 with invisible ink or the like, so as to normally appear invisible. Under illumination from light source 402, hidden portion 418 may be revealed to a participant. Such a hidden portion 418 may be used to selectively to reveal information to a participant such as, for example, a destination, a clue, a message, and/or the like.

Figure 5:
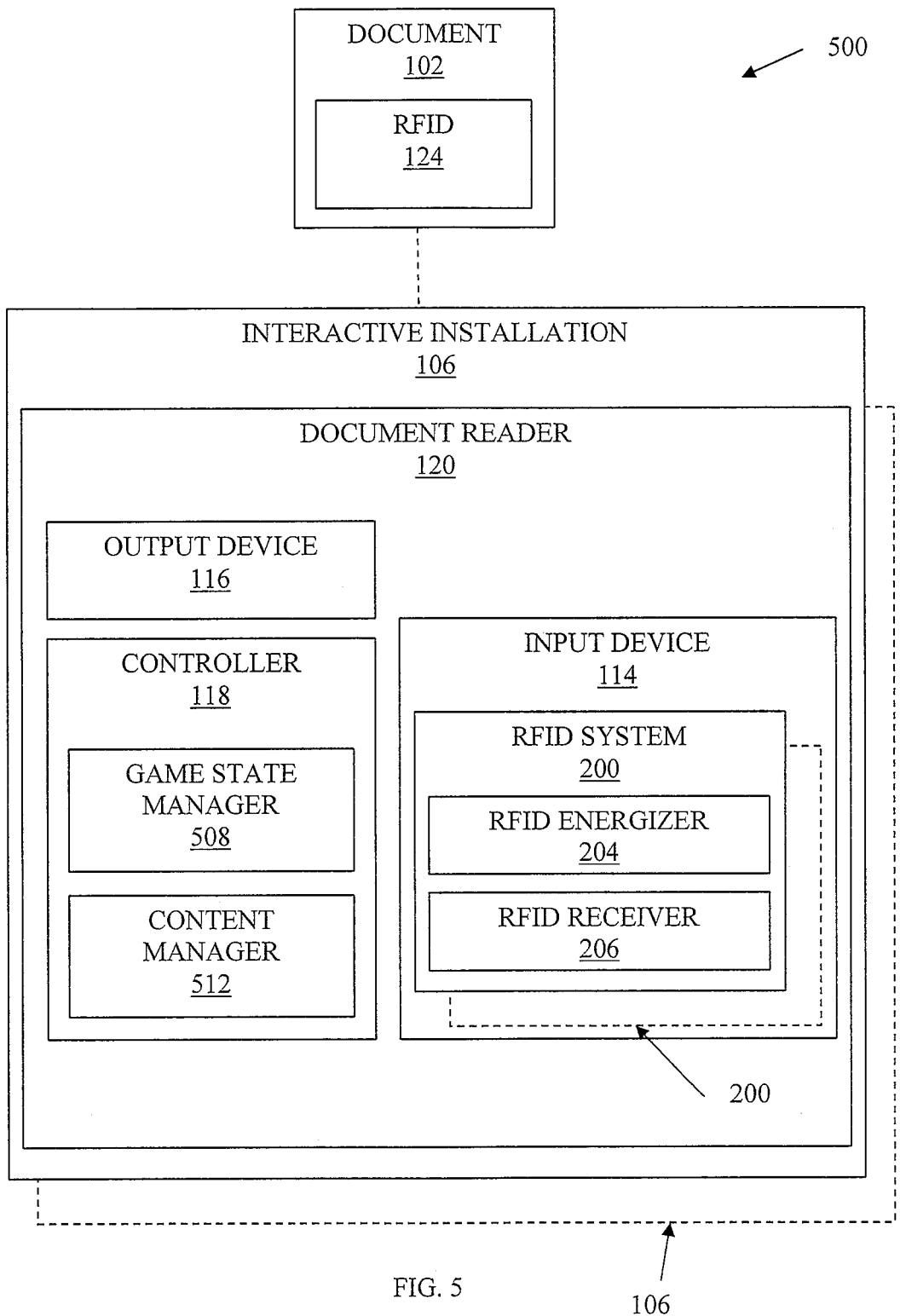
FIG. 5 is a schematic diagram of a system to provide an interactive gaming experience to game participants in accordance with one or more embodiments.

FIG. 5 provides a schematic diagram of a system 500 configured to support non-networked interactive installations 106. In the case of a non-networked installation shown in FIG. 5, logic and processes implemented by network-accessible services in FIG. 1 can be implemented by logic and processes implemented locally. For example, game state manager 508 implements functionality similar to game server 108 and content manager 512 implements functionality similar to content server 112.

Figure 6:
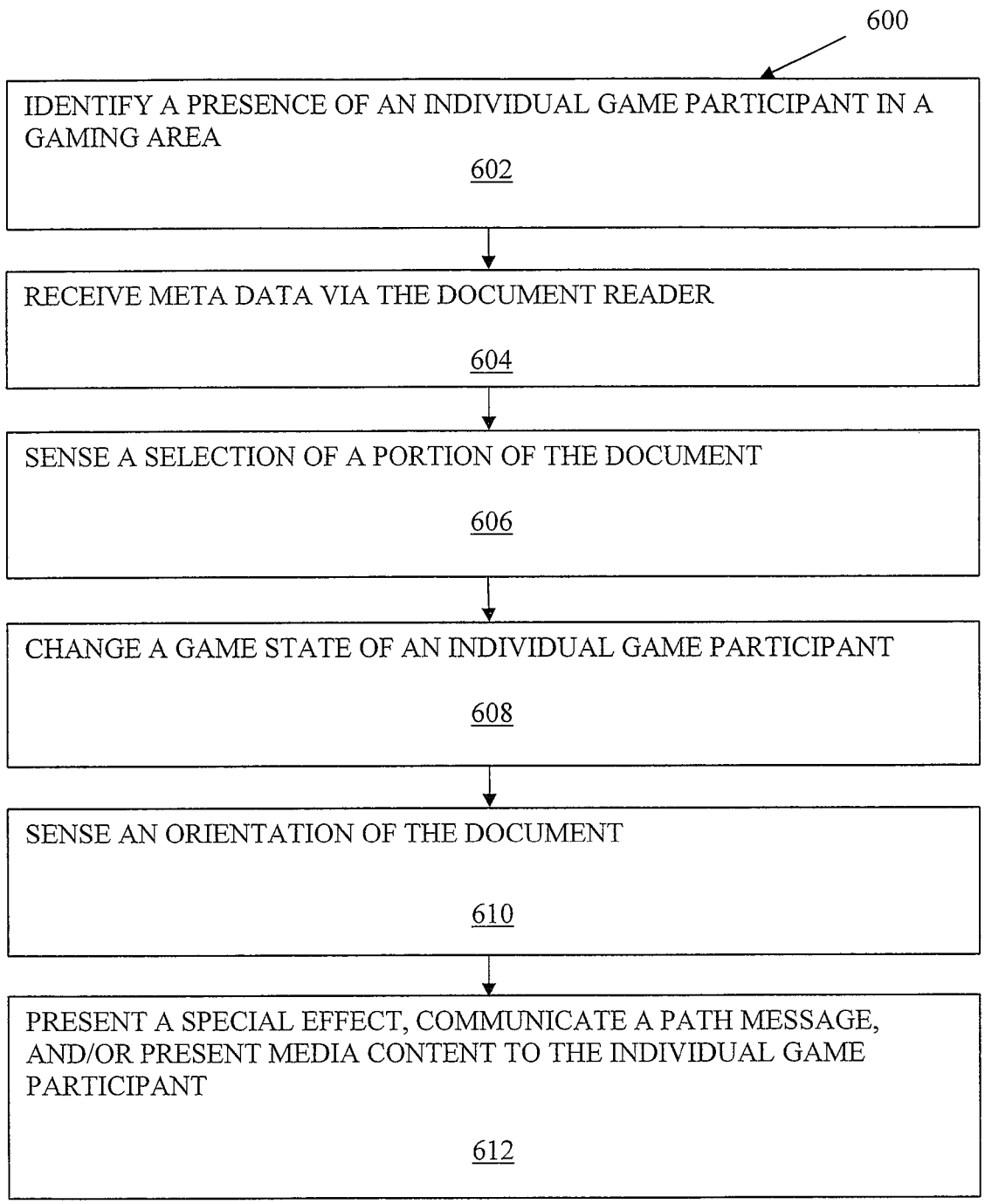
FIG. 6 is a flow diagram illustrating a procedure for providing an interactive gaming experience in accordance with one or more embodiments.

Procedure 600 illustrated in FIG. 6 may be implemented by system 100 and/or system 500 to provide an interactive experience. Additionally, although procedure 600, presents one particular order of actions, the order in which the actions are performed may be altered to meet the needs of a particular application. Several actions shown procedure 600 may be performed in parallel rather than sequentially and processes may be omitted unless specified as essential herein. Likewise, intervening actions shown in FIG. 6 and/or additional actions not shown in FIG. 6 may be employed and/or actions shown in FIG. 6 may be eliminated, without departing from the scope of claimed subject matter.

Procedure 600 may in alternative embodiments be implemented in software, hardware, and/or firmware, and may comprise discrete operations. Starting at block 602, a presence of an individual game participant may be identified in a gaming area. For example, such a presence of an individual game participant may be identified in a gaming area based at least in part on detection of a document 102/104 via RFID device 124 and/or barcode device 126.

At block 604, metadata may be received via document reader 120. Metadata may be received via document reader 120 via network 128 and/or via RFID device 124, for example.

At block 606, a selection of a portion of document 102/104 may be sensed via document reader 120. For example, a selection of a portion of document 102/104 may be sensed via document reader based at least in part on a touch activation of document reader 120 through document 102/104. In one example, virtual buttons 412/416 associated with document 102/104 may permit a participant to interact with document reader 120 via a touch screen 414 portion of input device 114.

At block 608, a game state of an individual game participant may be changed. For example, a game state of an individual game participant may be changed based at least in part on the identification of the individual game participant. Additionally or alternatively, a game state of an individual game participant may be changed based at least in part on the received metadata. Additionally or alternatively, a game state of an individual game participant may be changed based at least in part on the sensed selection of a portion of document 102/104. For example, a game state may be associated with variables such as progress, or lack of progress, through various stages of a multi-stage game. In a multiplayer game, a game state associated with a particular participant may include a measure of one or more of the aforementioned variables as applied to other participants in the game. For example, a game state associated with a particular participant in a multiplayer game may be based, at least in part, on progress or lack of progress of other participants in the game.

At block 610, an orientation of document 102/104 with respect to document reader 120 may be sensed via document reader 120. As discussed above, such orientation may be sensed based on one or more RFID devices 124 and/or one or more barcodes 126, for example. Other techniques for sensing orientation of document 102/104 include image analysis such as edge detection and/or character recognition to recognize alignment marks, graphics, or other material printed on or affixed to document 102/104. These image analysis techniques can also reveal the position, orientation, rotation, scale, and the like in operation 610.

At block 612, additional information such as a special effect may be presented to the participant or observer. For example, additional information such as a special effect may be presented to the individual game participant via document reader 120 based at least in part on a game state associated with an individual user and/or a detection of a presence of document 102/104. Additionally or alternatively, a special effect may be presented to the individual game participant via document reader 120 wherein the manner in which the additional information is presented is based at least in part on the sensed orientation of document 102/104. Further, such a special effect may be communicated to the individual game participant based at least in part on the sensed selection of a portion 412/414 of document 102/104.

As a specific example, a picture of a volcano may be printed on the front-side of document 102/104. A special effect may be presented to the individual game participant by projecting an image portion 404 comprising an animation of an eruption of the volcano on the front-side of document 102/104. Similarly, a picture of a ghost pirate's treasure chest may be printed on the front-side of document 102/104. A special effect may be presented to the individual game participant by projecting an image portion 404 comprising an animation of footsteps of a ghost pirate walking across the front-side of document 102/104 to the location of the ghost pirate's treasure chest. The projections are adapted based on the position, orientation, rotation and other characteristics of document 102/104 so that the projected information is aligned to the printed information. Moreover, the color of the projections can be modified to match or contrast with the printed information in a desired way.

Additionally or alternatively, at block 612, a path such as path 406 show in FIG. 4 may be communicated to the participant(s) or observers(s). A path message may indicate that a participant should proceed towards a particular location indicated on document 102 or backtrack to a previous location due to failure to complete a task, failure to progress through destinations in a predetermined order, and/or the like. Additionally or alternatively, at block 612, media content may be presented to the individual game participant.

In some examples described above with respect to FIGS. 1-6, an interactive experience may have been based at least in part on an identification of an individual participant. In some other examples described below, an interactive gaming experience may be provided to a participant without identification of an individual participant.

Figure 7:
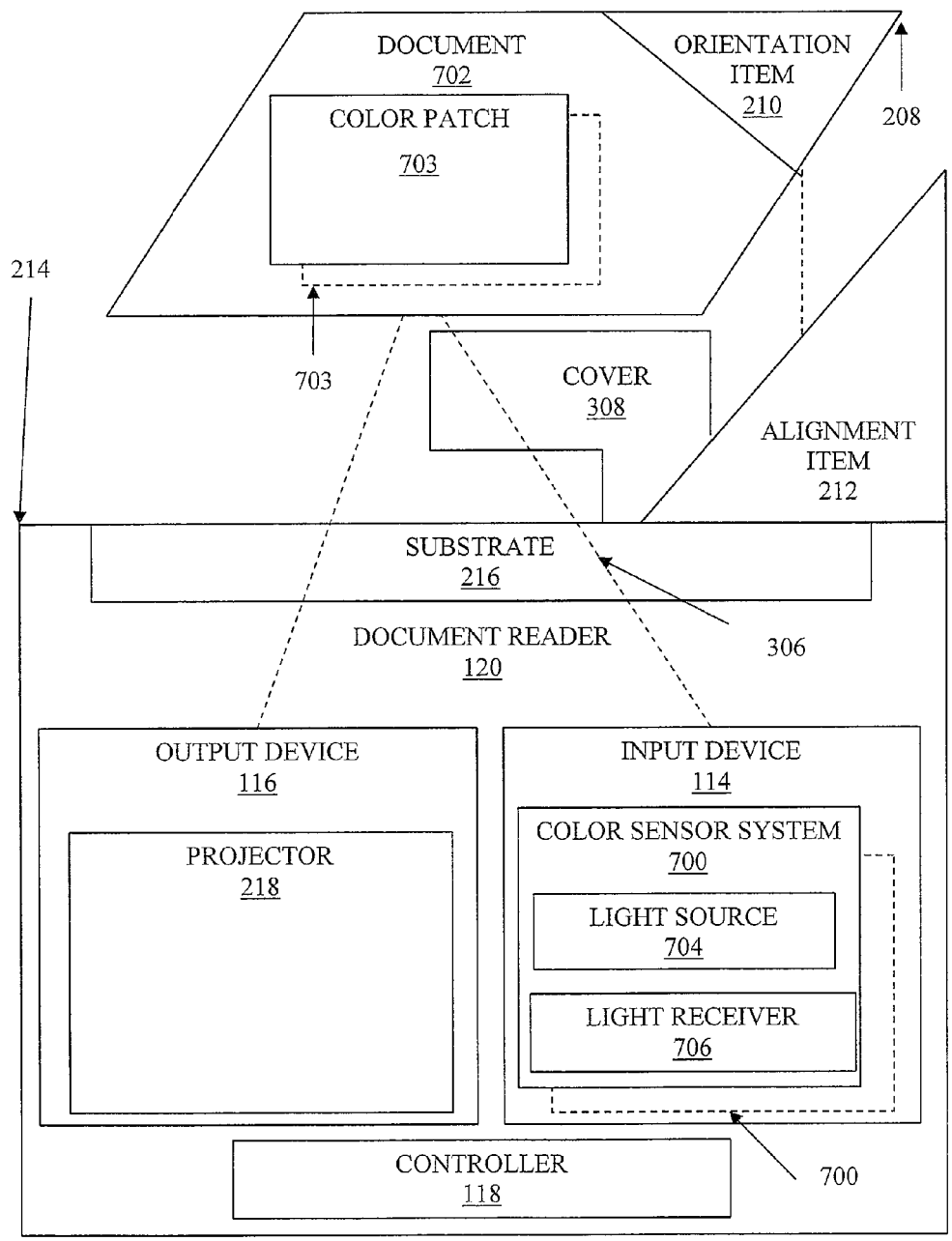
FIG. 7 is a schematic diagram illustrating a document reader in an interactive gaming environment in accordance with one or more embodiments.

In the particular implementation of FIG. 7, input device 114 may comprise a color sensor system 700 capable of detecting the presence of one or more color patches 703 associated with document 702, which is co-located with a game participant. When color sensor system 700 detects a presence of color patch 703 in proximity to document reader 120 (e.g., from color patch 703 being within a detection range), color sensor system 700 may detect a presence of a game participant in a gaming area.

According to the particular embodiment of FIG. 7, color sensor system 700 may comprise a light source 704 and a light receiver 706 pair. Light source 704 transmits light to be reflected from color patch 703. Light reflected from color patch 703 is detected by light receiver 706. Upon detection of reflected light by light receiver 706, controller 118 determines that document 702 is in proximity to document reader 120. Controller 118 may also use color detected by light receiver 706 to approximate position, rotation, orientation, scale and similar characteristics of a document 702 and align additional information that is presented to a participant or observer on document 702.

In some embodiments, color sensor system 700 may comprise three or more light receivers 706 and/or light sources 704 for locating three or more color patches 703 associated with document 702. For example, three or more color patches 703 may be affixed in an arbitrary position to document 702, such that the three or more color patches 703 may be read by three or more light receivers 706. Controller 118 may approximate the orientation of document 702 based at least in part on the readings made by the three or more light receivers 706. Increased accuracy in determining the orientation of document 702 may be obtainable through an increasing number of color patches 703 and/or an increasing number of light receivers 706 within color sensor system 700.

In some embodiments, color sensor system 700 may be directed at document through a clear portion 306 of translucent substrate 216. Such a clear portion 306 may facilitate detecting color patch 703 by color sensor system 700. Additionally or alternatively, document reader 120 may comprise a cover 308 capable of shielding a participant from emissions from color sensor system 700 and/or capable of shielding color sensor system 700 from outside light. For example, cover 308 may be oriented and arranged so as to be positioned between a participant and clear portion 306 of translucent substrate 216. When document 702 is placed on translucent substrate 216, document 702 may be located beneath cover 308.

Figure 8:
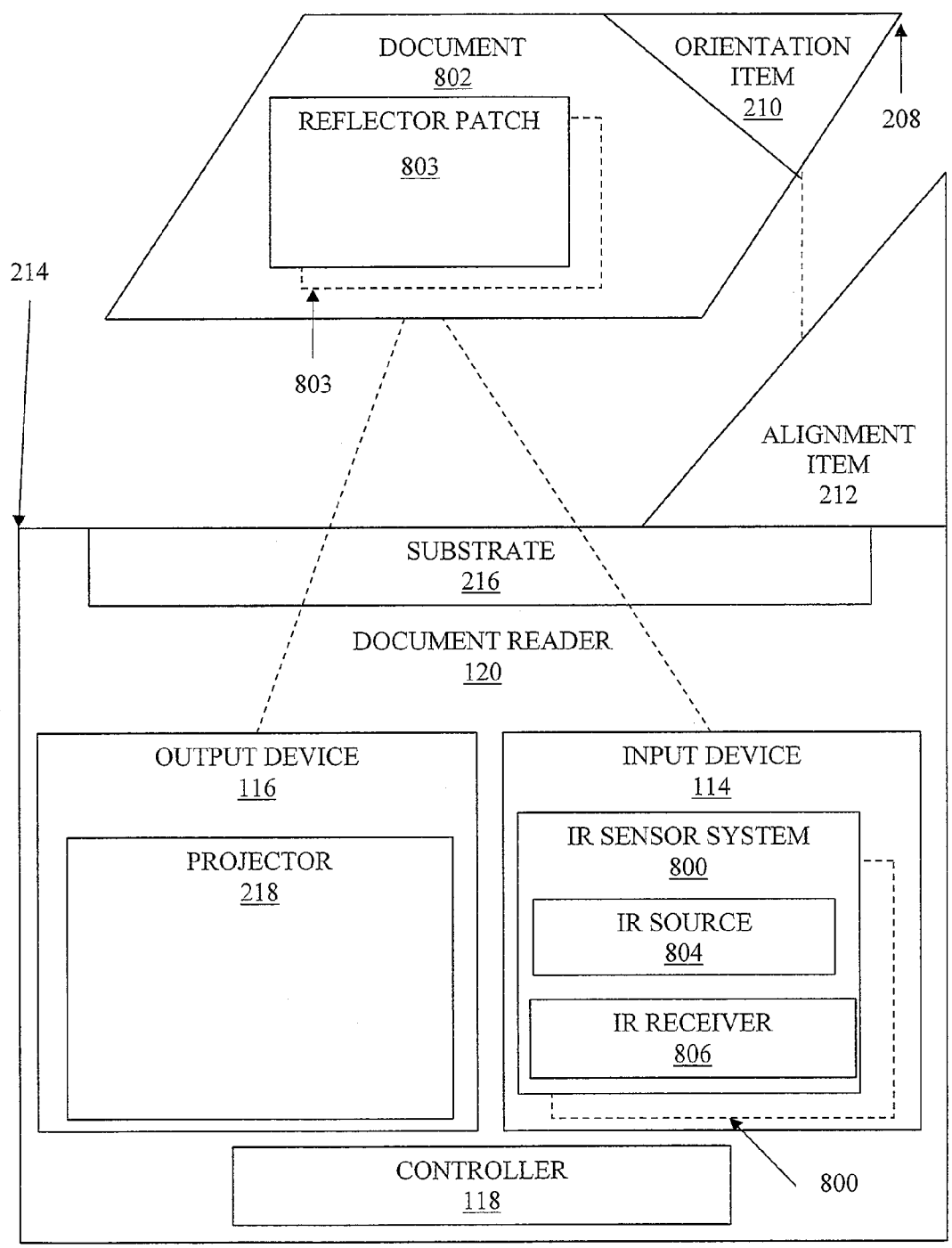
FIG. 8 is a schematic diagram illustrating a document reader in an interactive gaming environment in accordance with one or more embodiments.

The embodiment shown in FIG. 8 uses a reflective patch 803 to enable detection of document 802 and approximation of position, orientation, rotation and scale of a particular document 802. In the particular implementation of FIG. 8, input device 114 comprises an infrared (IR) sensor system 800 capable of detecting the presence of IR reflection from one or more reflector patches 803 associated with document 802. Presence of IR reflection from reflective patch 803 is used in a manner substantially similar to the detection of the presence of RFID device 126, barcode 226 and color patch 703.

According to a particular embodiment, IR sensor system 800 comprises an IR source 804 and an IR receiver 806. IR source 804 transmits IR light to be reflected from reflective patch 803. In one example, IR receiver 806 comprises a video camera or charge coupled device (CCD) array with an IR filter, and/or the like, capable of detecting IR light reflected from reflective patch 803. IR light reflected off of reflective patch 803 may be detected by IR receiver 806. Upon detection of reflected IR light by IR receiver 806, controller 118 may determine that document 802 is in proximity to document reader 120.

In some embodiments, IR sensor system 800 may comprise three or more IR receivers 806 and/or IR sources 804 for locating three or more reflector patches 803 associated with document 802. For example, three or more reflector patches 803 may be affixed in an arbitrary position to document 802, such that the three or more reflector patches 803 may be read by three or more IR receivers 806. Controller 118 may approximate the orientation of document 802 based at least in part on the readings made by the three or more IR receivers 806. Increased accuracy in determining the orientation of document 802 may be obtainable through an increasing number of reflector patches 803 and/or an increasing number of IR receivers 806 within IR sensor system 800.

Figure 9:
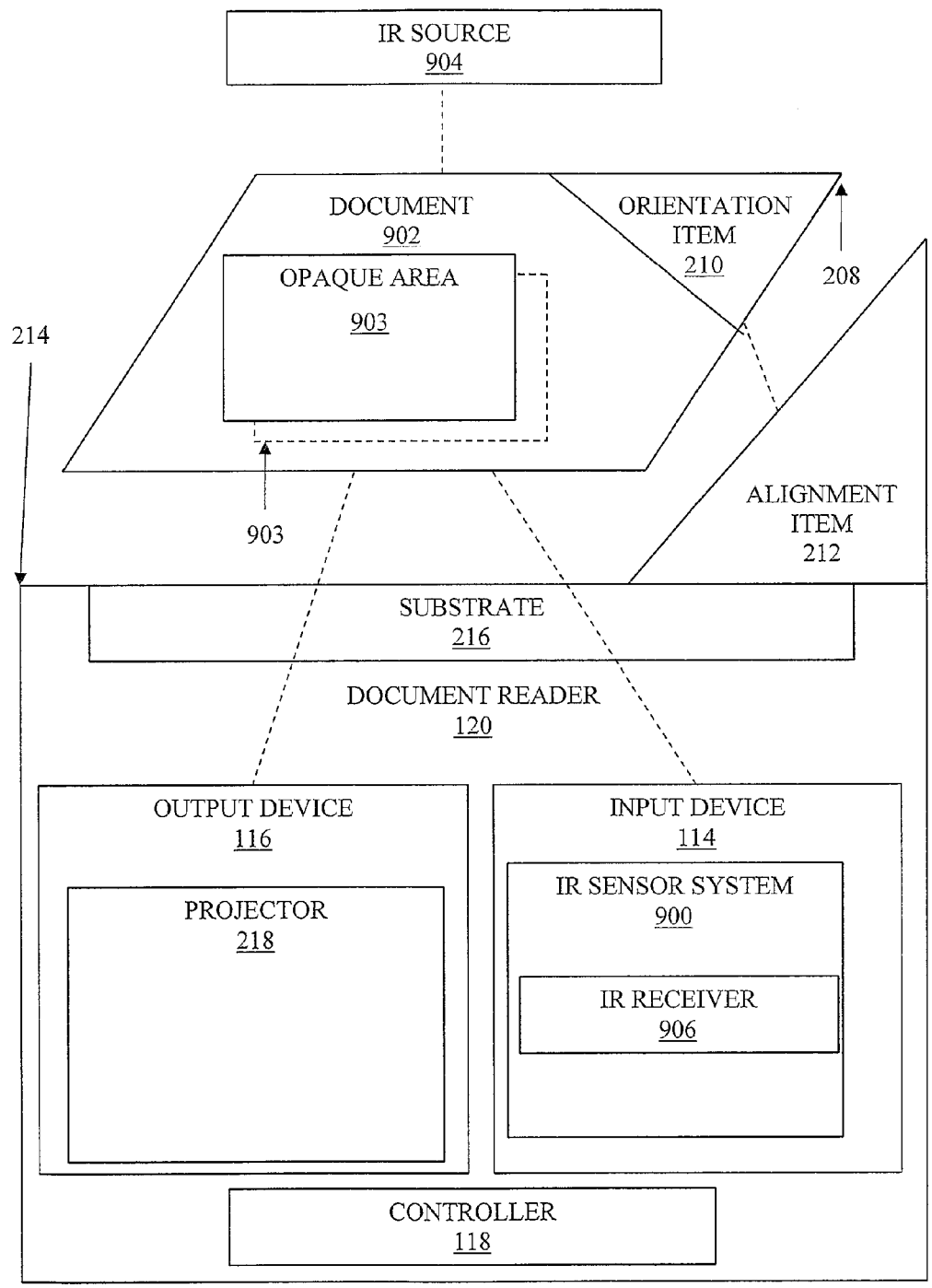
FIG. 9 is a schematic diagram illustrating a document reader in an interactive gaming environment in accordance with one or more embodiments.

Referring to FIG. 9, a schematic diagram illustrates a document reader 120 in which input device 114 comprises an infrared (IR) sensor system 900 capable of detecting the presence of document 902. Presence of document 902 in proximity to document reader 120, is used in a manner substantially similar to the detection of presence of RFID device 126, barcode 226, color patch 703 and reflector 803 described hereinbefore.

According to a particular embodiment, IR sensor system 900 may comprise an IR source 904 and an IR receiver 906 pair. In one example, IR source 904 may be positioned so as to transmit IR light to IR receiver 906 through substrate 216. IR receiver 906 may comprise a video camera with an IR filter, and/or the like, capable of detecting IR light from IR source 904. IR source 904 may transmit IR light to IR receiver 906. When document 902 is placed on substrate 216, at least a portion of IR light from IR source 904 may be blocked from being received by IR receiver 906. For example, controller 118 may monitor a field of IR light detected by IR receiver 906 to determine if a non-illuminated field is approximately the shape and/or size of an expected document 902.

Referring to FIG. 11, a partial sectional side view illustrates a document reader 120 similar to the embodiment described in FIG. 9. In the particular implementation of FIG. 11, a game participant 1102 may place document 902 onto substrate 216 of document reader 120. As described above, IR source 904 may be positioned so as to transmit IR light to IR receiver 906 through substrate 216. IR receiver 906 may comprise a video camera 1104 with an IR filter 1106. Such a video camera 1104 equipped with IR filter 1106 may be capable of detecting IR light transmitted from IR source 904. As illustrated, a reflective surface 1108 may be positioned in line with IR source 904 and substrate 216 so as to be capable of reflecting IR light from IR source 904 to IR receiver 906.

When game participant 1102 places document on substrate 216, at least a portion of IR light from IR source 904 may be blocked from being received by IR receiver 906. Upon detection of such blocked IR light by video camera 1104 equipped with IR filter 1106, controller 118 may determine that document 902 and game participant 1102 are in proximity to document reader 120, for example. Additionally or alternatively, controller 118 may determine the orientation of document 902 based at least in part on the readings made by video camera 1104 that may detect a pattern in IR light from IR source 904 not blocked by document 902. As mentioned above, document reader 120 may alter the appearance of document 902 to present a visual special effect to the one or more game participants based at least in part on the orientation of document 902. For example, a rotational displacement may be utilized to rotate a visual special effect based on a rotational skew between document 904 and document reader 120. Projector 218 may rear project a video image through translucent substrate 216 and through document 102 so as to be viewable to participant 1102. As illustrated, reflective surface 1108 may be positioned so as to be capable of reflecting a video image projected from projector 218 to translucent substrate 216. Additionally or alternatively, an IR blocking filter may be associated with projector 218 so as to block IR light from emanating from projector 218 and potentially interfering with IR light detection by video camera 1104.

Referring back to FIG. 9, additionally or alternatively, IR sensor system 900 may detect the orientation of document 902 based at least in part on the readings made by IR receiver 906 detecting a pattern in IR light from IR source 904 not blocked by document 902. For example, controller 118 may monitor a field of IR light detected by IR receiver 906 to determine the shape, size, and/or orientation of a non-illuminated field corresponding with an expected document 902.

Accordingly, controller 118 may approximate the orientation of document 902 based at least in part on the readings made by IR receiver 906.

In some embodiments, IR sensor system 900 may locate three or more opaque areas 903 associated with document 902. In such embodiments, IR sensor system 900 may detect the orientation of document 902 based at least in part on the readings made by IR receiver 906 detecting a pattern in IR light from IR source 904 that pass through opaque areas 903 of document 902. For example, three or opaque areas 903 may be provided in an arbitrary position in document 902, such that the three or more opaque areas 903 may be read by IR receiver 906. Controller 118 may approximate the orientation of document 902 based at least in part on the readings made by IR receiver 906. For example, a lateral displacement, a horizontal displacement, a rotational displacement, a vertical displacement, and/or the like may be approximated based at least in part on the readings made by IR receiver 906. Increased accuracy in determining the orientation of document 902 may be obtainable through an increasing number of opaque areas 903.

Some portions of procedure 600 may be used in gaming environments via one or more document readers 120 illustrated in FIGS. 4 and 7-9. For example, document reader 120 may be aware from user interaction with input device 114 that a particular user has a particular destination in mind. Additionally or alternatively, document reader 120 may be aware from a preset sequential game rout that a participant may be sent to a particular destination. For example, this may be the case in environments operating without the use of metadata. In such a case, the presentation of a special effect, communication of a path message, and/or presentation of media content may be based at least in part on a detected presence of document 702/802/902.

In one example of procedure 600, a first game participant may be assigned to a first group of document readers 120 comprising a first rout and/or a first set of tasks, while a second game participant may be assigned to a second group of document readers comprising a second rout and/or a second set of tasks. In such a case, a path message may be communicated so as to indicate whether such a first and/or second participant are on a corresponding first and/or second assigned routs. Such a path message may be communicated so as to confirm that first participant is correctly on a corresponding first rout and/or is correctly progressing through destinations in a predetermined order. Likewise, such a path message may be communicated so as to confirm that first participant is incorrectly on a non-corresponding second rout and/or is incorrectly progressing through a predetermined order of destinations. Further, such a path message may be communicated to the individual game participant based, at least in part, on the sensed selection of a portion 412/414 of document 702/802/902.

It should also be understood that, although particular embodiments have just been described, the claimed subject matter is not limited in scope to a particular embodiment or implementation. For example, embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description above.

What is claimed is:

1. A method comprising:
   detecting, in an interactive gaming experience, orientation of a physical document via a document reader, the document comprising a map;
   projecting information onto said document via said document reader wherein the manner in which the information is projected is based, at least in part, on said detected orientation, the document comprising a sheet of media having fixed information depicted thereon, the manner in which the information is projected being based on aligning the projected information with the fixed information;
   identifying a user of the document based, at least in part, on detection of a signature associated with the document; and
   presenting media content to the identified user based, at least in part, on the identification.

2. The method of claim 1, further comprising sensing a selection of a portion of said document via said document reader based, at least in part, on a touch activation of said document reader through said document.

3. The method of claim 1, further comprising:
   wherein said projecting information comprises rear projecting an image of said document through an underside of said document.

4. The method of claim 1, wherein said projecting information comprises illuminating a hidden portion of said document.

5. The method of claim 1, wherein the projected information comprises information selected from the group consisting of: text, animation, video, a static image, highlighting, graphic information; and symbols.

6. The method of claim 1, wherein the projected information comprises a path connecting two or more depicted locations on the map.

7. A method comprising:
   detecting, in an interactive gaming experience, presence of a physical document via a document reader;
   altering an appearance of the document to present information based, at least in part, on said detected presence;
   sensing an orientation of the document;
   altering the appearance of the document based, at least in part, on the sensed orientation
   identifying a user of the document based, at least in part, on detection of a signature associated with the document; and
   altering the appearance of the document, at least in part, on the identification of said user.

8. An interactive document reader, comprising:
   a document sensor indicating presence of a physical document in an interactive gaming experience;
   an orientation sensor indicating orientation of the sensed document; and
   a projector displaying information on the document in a manner that is based, at least in part, on the indications from the document sensor and the orientation sensor, wherein a user of the document is identified, at least in part, on detection of a signature associated with the document, wherein media content is presented to the identified user based, at least in part, on the identification.

9. The interactive document reader of claim 8, further comprising:

a signature reader operable to read a signature associated with the document and transmit the signature.

10. The interactive document reader of claim 8, further comprising:
a metadata reader operable to read metadata from said document and transmit the metadata.

11. The interactive document reader of claim 8, further comprising:
a metadata writer operable to store metadata on said document.

12. The interactive document reader of claim 8, further comprising:
a touch sensor operable to sense a selection of a portion of said document based, at least in part, on a touch activation through said document.

13. An apparatus, comprising:
means for detecting, in an interactive gaming experience, a presence of one or more physical documents; and
means for altering an appearance of the document to present a special effect based, at least in part, on said detected presence
means for sensing an orientation of the document;
means for altering the appearance of the document based, at least in part, on the sensed orientation
means for identifying a user of the document based, at least in part, on detection of a signature associated with the document; and
means for altering the appearance of the document, at least in part, on the identification of said user.

14. An interactive document, comprising:
a sheet of media having a first portion information depicted thereon, wherein placement of the first portion of the information has a suitable orientation and arrangement;
a device on the sheet of media configured to communicate the orientation of the sheet of media to an external interactive document reader in an interactive gaming experience; and
a projection surface integrated with the sheet of media, wherein appearance of the sheet of media is alterable to present a second portion of information projected by the external interactive document reader to the projection surface, wherein the second portion of information is projected in alignment with the first portion of information, wherein a user of the sheet of media is identified, at least in part, on detection of a signature associated with the sheet of media, wherein media content is presented to the identified user based, at least in part, on the identification.

15. A method comprising:
detecting, in an interactive gaming experience, orientation of a physical document via a document reader; and
projecting information onto said document via said document reader wherein the manner in which the information is projected is based, at least in part, on said detected orientation, said document comprising a sheet of media having fixed information depicted thereon, the manner in which the information is projected being based on aligning the projected information with the fixed information;
identifying a user of said document based, at least in part, on detection of a signature associated with said document; and
presenting media content to said identified user based, at least in part, on said identification.

16. The method of claim 15, further comprising sensing a selection of a portion of said document via said document reader based, at least in part, on a touch activation of said document reader through said document.

17. The method of claim 15, further comprising:
wherein said projecting information comprises rear projecting an image of said document through an underside of said document.

18. The method of claim 15, wherein said projecting information comprises illuminating a hidden portion of said document.

19. The method of claim 15, wherein the projected information comprises information selected from the group consisting of: text, animation, video, a static image, highlighting, graphic information; and symbols.

20. The method of claim 15, wherein the document comprises a map having a plurality of locations depicted thereon and the projected information comprises a path connecting two or more of the depicted locations.

* * * * *